No. 695,166. Patented Mar. 11, 1902.
W. H. MOSS.
LAWN TRIMMER.
(Application filed Aug. 13, 1901.)
(No Model.)

Witnesses
J. P. Britt
Harry Ellis Chandler

Inventor
W. H. Moss,
Attorneys

UNITED STATES PATENT OFFICE.

WILLIAM H. MOSS, OF PORT HURON, MICHIGAN.

LAWN-TRIMMER.

SPECIFICATION forming part of Letters Patent No. 695,166, dated March 11, 1902.

Application filed August 13, 1901. Serial No. 71,951. (No model.)

*To all whom it may concern:*

Be it known that I, WILLIAM H. MOSS, a citizen of the United States, residing at Port Huron, in the county of St. Clair, State of Michigan, have invented certain new and useful Improvements in Lawn-Trimmers; and I do hereby declare the following to be a full, clear, and exact description of the invention, such as will enable others skilled in the art to which it appertains to make and use the same.

This invention relates to lawn-mowers; and it has for its object to provide an attachment therefor which may be used for increasing the width of the mower and which may be used for trimming around paths, trees, and shrubs and in other places where a sickle is ordinarily used.

A further object of the invention is to provide a device of this nature which may be readily attached and detached and which when in place will be held rigidly.

Other objects and advantages of the invention will be understood from the following description.

Figure 1:
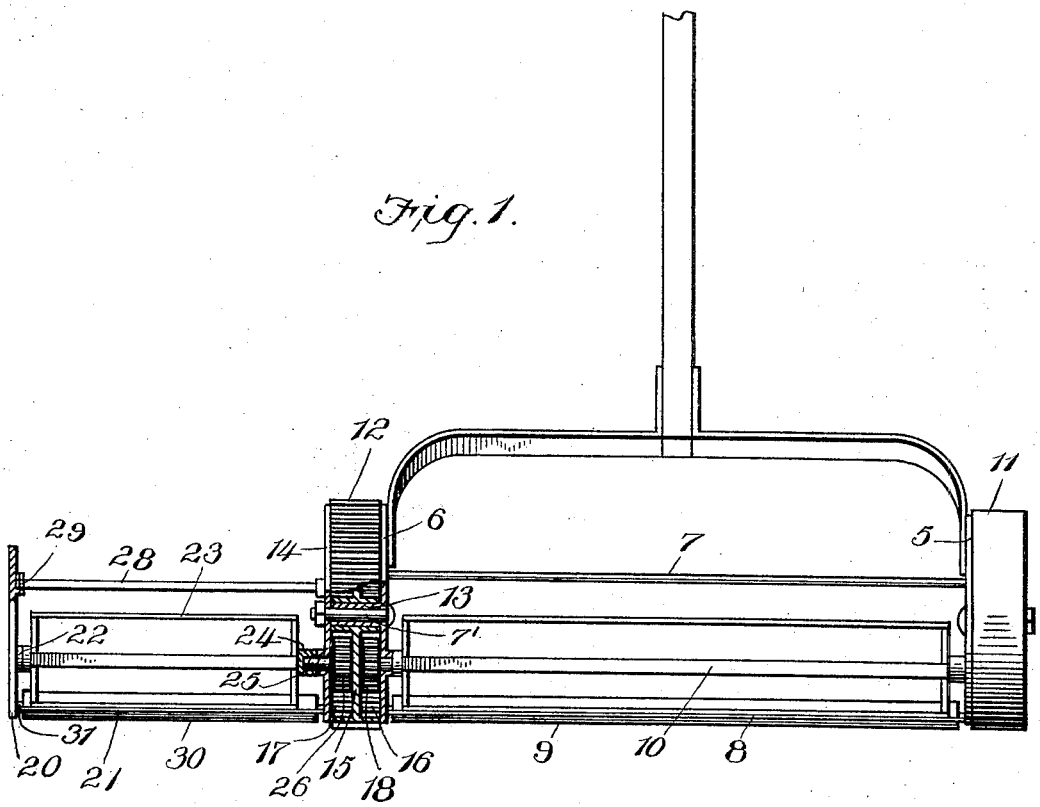
Figure 2:
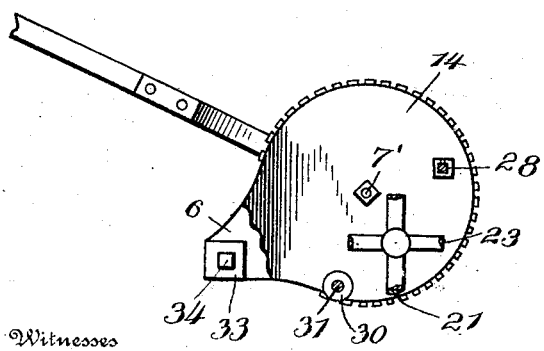
Figure 3:
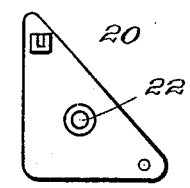

In the drawings forming a portion of this specification, and in which like numerals of reference indicate similar parts in the several views, Figure 1 is view partly in section and partly in elevation and showing the attachment in place. Fig. 2 is a transverse vertical section through the attachment looking in the direction of the mower. Fig. 3 is a detail elevation of the outer guard-board of the attachment.

Referring now to the drawings, there is shown a lawn-mower to which the present invention is attached, and which lawn-mower includes the end castings 5 and 6, having the connecting-braces 7, and between which are disposed the fixed knife 8, the roller 9, and the rotary knife 10. Exterior to the castings 5 and 6 are the forward supporting-wheels 11 and 12, of which the wheel 12 is the bull-wheel and has its outer periphery corrugated, as shown. The wheel 12 is mounted upon the hollow axle 13, extending outwardly from the casting 6, and through this hollow axle is passed a bolt 7', which is passed also through an outside covering-plate 14 for the wheel and acts to hold it rigidly against the end of the hollow axle. The felly or rim of the bull-wheel is supported from a web 15, which carries the hub of the wheel, and the inner periphery of the felly is provided with the internal gears 16 and 17, located at opposite sides of this web. The gear 16 drives the rotary knife of the main mower, and meshing therewith is a pinion 18, which is fixed to the end of the knife-axle, which is extended through the casting 6 for this purpose.

The attachment consists of a guard-board 20, to which is rigidly connected one end of a fixed knife 21, the board having also a bearing 22, which receives the trunnion at one end of the rotary knife or cutter 23. At the other end of the rotary cutter is a hub 24, having a threaded axial perforation for engagement by the threaded end of the shaft 25, which is passed through the plate 14, in which it has a bearing, the shaft at its inner end having a pinion 26, which meshes with the internal gear 17, the direction of rotation of the shaft by the gear being such as to tend to screw the shaft into the hub, and when it is to be disconnected it is reversely rotated. To make the attachment rigid in its connection, a brace-rod 28 is provided and has headed ends 29 for engagement with keyhole-slots in the plate 14 and guard-board. This permits of quickly withdrawing the brace when the attachment is to be disconnected and also enables the attachment to be as readily connected. Between the guard-board and the plate 14 is disposed a roller 30, which is mounted upon a shaft 31, which is bolted rigidly to the guard-board at one end, while the other end is adapted for engagement with a keyhole-slot in the plate 14 and serves as a further brace for the structure. The plate 14 extends rearwardly beyond the bull-wheel to correspond to the adjacent end casting 6, and between these end portions is disposed a plate 33, having removable connections therewith to permit of easy connection and disconnection, this plate being attached by means of headed studs 34, which engage in keyhole-slots in the plates. With this construction it will be seen that there is provided an attachment that may be readily connected and disconnected and which when in place will cut practically to the end of the attachment, making it efficient as a device for trimming around open spaces.

In practice modifications of the specific construction shown may be made and any suitable materials and proportions may be used for the various parts without departing from the spirit of the invention.

What is claimed is—

1. The combination with a mower including a bull-wheel having a central web, an internal gear at each side of the web, and having a rotary cutter provided with a pinion engaged with one of the gears, of a second rotary cutter having a pinion engaged with the second internal gear, and means for holding the second cutter with its pinion in engagement with the gear, said cutter having a fixed cutter in coöperative relation thereto.

2. The combination with a mower including a bull-wheel having separate internal gears and a rotary cutter operatively connected with one of them for rotation thereby, of a pinion engaged with the other gear, a rotary knife connected with the pinion for rotation thereby, and a fixed knife in operative relation to the rotary knife.

3. The combination with a mower including a fixed knife, a rotary knife in operative relation to the fixed knife, end castings with which the fixed knife is connected, one of the castings having a hollow axle, and a bull-wheel journaled upon the axle, said wheel having spaced gears with one of which the knife is operably connected, a plate disposed against the end of the hollow axle, an attaching-bolt passed through the plate and axle, a guard-board, connections between the plate and guard-board, a pinion engaged with the second gear and having a shaft journaled in the plate, a rotary knife journaled at one end in the guard-board and removably engaged at its other end with the shaft, and a fixed knife in operative relation to the rotary knife.

In testimony whereof I affix my signature in presence of two witnesses.

WILLIAM H. MOSS.

Witnesses:
W. L. SMITH,
J. G. AUSTIN.